(12) United States Patent
Friedman et al.

(10) Patent No.: US 10,579,092 B2
(45) Date of Patent: Mar. 3, 2020

(54) GLOBAL TIMING GENERATOR

(71) Applicant: INTERNATIONAL BUSINESS MACHINES CORPORATION, Armonk, NY (US)

(72) Inventors: Daniel J. Friedman, Sleepy Hollow, NY (US); Seongwon Kim, Old Tappan, NJ (US); Bipin Rajendran, Newark, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 200 days.

(21) Appl. No.: 15/340,401

(22) Filed: Nov. 1, 2016

(65) Prior Publication Data
US 2018/0232005 A1     Aug. 16, 2018

(51) Int. Cl.
*G06F 1/08* (2006.01)
*G06N 3/04* (2006.01)
*G06N 3/063* (2006.01)

(52) U.S. Cl.
CPC .............. *G06F 1/08* (2013.01); *G06N 3/049* (2013.01); *G06N 3/063* (2013.01)

(58) Field of Classification Search
None
See application file for complete search history.

(56) References Cited

U.S. PATENT DOCUMENTS

| | | | | |
|---|---|---|---|---|
| 4,581,769 A | * | 4/1986 | Grimsley | G01S 7/022 324/76.27 |
| 4,935,942 A | * | 6/1990 | Hwang | G06F 1/12 327/269 |
| 5,128,970 A | * | 7/1992 | Murphy | H04L 7/033 327/141 |
| 5,142,666 A | | 8/1992 | Yoshizawa et al. | |
| 5,261,424 A | * | 11/1993 | Sprinkel, Jr. | A24F 47/008 128/202.21 |
| 5,889,781 A | | 3/1999 | Eftimakis et al. | |
| 6,163,584 A | * | 12/2000 | Weng | H03K 5/135 327/141 |
| 7,242,170 B1 | * | 7/2007 | Natsume | H02M 1/32 323/222 |
| 2006/0271342 A1 | | 11/2006 | Farhat et al. | |

(Continued)

OTHER PUBLICATIONS

Monteiro et al., Wayback Machine capture—A Case for a Triangular Waveform Clock Signal, Oct. 8, 2006 (Year: 2006).*

(Continued)

*Primary Examiner* — Danny Chan
(74) *Attorney, Agent, or Firm* — Cantor Colburn LLP; Daniel Morris

(57) ABSTRACT

Aspects include a method for generating a signal in response to an event. The method includes receiving, from a clock signal generator, a clock signal, wherein the clock signal has a fixed clock period. The method further includes receiving an indication of a pulse and, responsive to receiving the indication of the pulse, generating an output comprising a high voltage having a starting time and an ending time. The starting time is a first time when the indication of the asynchronous event is received, and the ending time is a second time at one fixed clocked period from the starting time.

11 Claims, 6 Drawing Sheets

(56) References Cited

U.S. PATENT DOCUMENTS

| | | | |
|---|---|---|---|
| 2007/0236257 A1* | 10/2007 | Kejriwal | H03K 5/1252 |
| | | | 327/34 |
| 2010/0106041 A1* | 4/2010 | Ghovanloo | A61B 5/0006 |
| | | | 600/544 |
| 2010/0257130 A1 | 10/2010 | Smallridge | |
| 2012/0084241 A1 | 4/2012 | Friedman et al. | |
| 2012/0239108 A1 | 9/2012 | Foutz et al. | |
| 2013/0031039 A1* | 1/2013 | Sim | G06N 3/049 |
| | | | 706/26 |
| 2013/0311415 A1 | 11/2013 | Nishitani et al. | |
| 2014/0330761 A1* | 11/2014 | Kim | G06N 3/049 |
| | | | 706/25 |
| 2015/0302294 A1 | 10/2015 | Modha | |
| 2017/0272116 A1* | 9/2017 | Yu | H04B 1/69 |
| 2018/0121087 A1* | 5/2018 | Schmitz | G06F 3/061 |

OTHER PUBLICATIONS

Stone, Ken, Wayback Machine capture—XOR/XNOR Logic, Nov. 18, 2010 (Year: 2010).*
Sussillo, et al., Generating Coherent Patterns of Activity From Chaotic Neural Networks, National Institute of Health, NIH Public Access Author Manuscript, Neuron. Author manuscript available in PMC Aug. 27, 2010; published in final edited form as: Neuron. Aug. 27, 2009; 63(4); 544-557.

* cited by examiner

GLOBAL TIMING GENERATOR

STATEMENT REGARDING FEDERALLY SPONSORED RESEARCH OR DEVELOPMENT

This invention was made with government support under Contract No.: HR0011-09-C-002 awarded by Defense Advanced Research Project Agency (DARPA). The government has certain rights to this invention.

BACKGROUND

The present disclosure relates generally to timing generators, and more specifically, to a method, system, and computer program product for generating a signal in response to an event.

In a neural network, each artificial neuron needs to know a timing interval to generate proper axon and dendrite signals. The timing interval is needed so neurons can communicate with other neurons and generate their own timing. The duration of the timing interval should precisely match with the other neurons in the neural network. Each neuron self-generating a timing interval on its own costs power. Timing errors lead to non-working neuron interface circuits and results in power or space wasting.

SUMMARY

According to embodiments, a system for generating a signal in response to an event is described. The system includes a processor communicatively coupled to a memory, the process configured to perform a method. The method includes receiving, from a clock signal generator, a clock signal, wherein the clock signal has a fixed clock period. The method further includes receiving an indication of a pulse and, responsive to receiving the indication of the pulse, generating an output that includes a high voltage having a starting time and an ending time. The starting time is a first time when the indication of the asynchronous event is received, and the ending time is a second time at one fixed clocked period from the starting time.

In accordance with an embodiment of the invention, a method for generating a signal in response to an event is described. The method includes receiving, from a clock signal generator, a clock signal, wherein the clock signal has a fixed clock period. The method further includes receiving an indication of a pulse and, responsive to receiving the indication of the pulse, generating an output that includes a high voltage having a starting time and an ending time. The starting time is a first time when the indication of the asynchronous event is received, and the ending time is a second time at one fixed clocked period from the starting time.

In accordance with another embodiment of the invention, a computer program product for generating a signal in response to an event is described. The computer program product includes a computer readable storage medium having program instructions embodied therewith, the program instructions executable by a processor located on a device to cause the computer processor to perform a method. The method includes receiving, from a clock signal generator, a clock signal, wherein the clock signal has a fixed clock period. The method further includes receiving an indication of a pulse and, responsive to receiving the indication of the pulse, generating an output that includes a high voltage having a starting time and an ending time. The starting time is a first time when the indication of the asynchronous event is received, and the ending time is a second time at one fixed clocked period from the starting time.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with embodiments of the disclosure, a method and apparatus for initializing scannable and non-scannable latches from a common clock buffer is provided. Embodiments described herein include a circuit that receives a square wave clock input and a triangle wave input. The circuit also receives an indication of an asynchronous event that triggers the circuit to turn on and measure from the time the asynchronous event occurs to a time that is one full clock period of the triangle wave input. The circuit generates a pulse that matches the full clock period of the triangle wave and initializes the pulse at the time the asynchronous event occurs. The pulse ends at the time that is one full clock period from the asynchronous event. Thus, the embodiments described herein generate a global timing interval that can be used by all the neurons in a neural network. This ensures that all the neurons use the same timing information, and that the timing intervals of the neurons are matched.

In general, each neuron self-generating a timing interval requires a high frequency clock distributed to all blocks of neurons and a local generation of a time constant for each timer. High frequency clocks are power hungry and require significant digital area within a chip and local generation of a time constant requires significant calibration. The present invention works to avoid these issues by utilizing a low frequency clock input Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101).

In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

Figure 1:
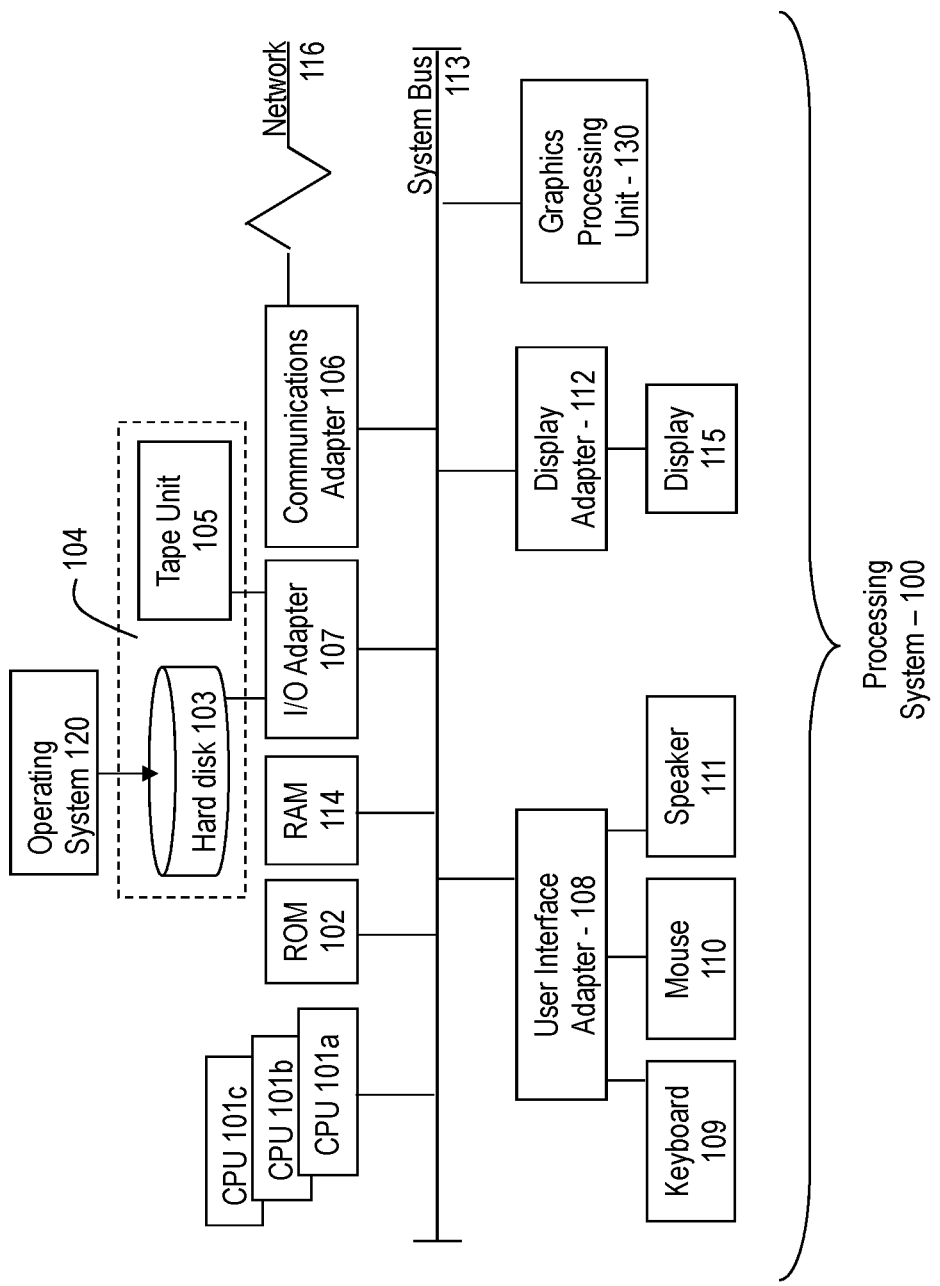
FIG. 1 is a block diagram illustrating one example of a processing system for practice of the teachings herein.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. The system 100 can be implemented in order to perform the testing of various semiconductors and IC devices.

While the computer system described above can be utilized to drive the circuit components utilizing a traditional digital model of manipulating zeros and ones, an artificial neural network (ANN) can be utilized for this invention. For example, IBM's SyNapse computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which can be formed from thin film material.

Crosspoint devices, in effect, function as the ANN's weighted connections between neurons. Nanoscale two-terminal devices, for example memristors having "ideal" conduction state switching characteristics, are often used as the crosspoint devices in order to emulate synaptic plasticity with high energy efficiency. The conduction state (e.g., resistance) of the ideal memristor material can be altered by controlling the voltages applied between individual wires of the row and column wires. Digital data can be stored by alteration of the memristor material's conduction state at the intersection to achieve a high conduction state or a low conduction state. The memristor material can also be programmed to maintain two or more distinct conduction states by selectively setting the conduction state of the material. The conduction state of the memristor material can be read by applying a voltage across the material and measuring the current that passes through the target crosspoint device.

In order to limit power consumption, the crosspoint devices of ANN chip architectures are often designed to utilize offline learning techniques, wherein the approximation of the target function does not change once the initial training phase has been resolved. Offline learning allows the crosspoint devices of crossbar-type ANN architectures to be simplified such that they draw very little power.

Notwithstanding the potential for lower power consumption, executing offline training can be difficult and resource intensive because it is typically necessary during training to modify a significant number of adjustable parameters (e.g., weights) in the ANN model to match the input-output pairs for the training data. Accordingly, simplifying the crosspoint devices of ANN architectures to prioritize power-saving, offline learning techniques typically means that training speed and training efficiency are not optimized.

Instead of utilizing the traditional digital model of manipulating zeros and ones, ANNs create connections between processing elements that are substantially the functional equivalent of the core system functionality that is being estimated or approximated. For example, IBM™'s SyNapse™ computer chip is the central component of an electronic neuromorphic machine that attempts to provide similar form, function and architecture to the mammalian brain. Although the IBM SyNapse computer chip uses the same basic transistor components as conventional computer chips, its transistors are configured to mimic the behavior of neurons and their synapse connections. The IBM SyNapse computer chip processes information using a network of just over one million simulated "neurons," which communicate with one another using electrical spikes similar to the synaptic communications between biological neurons. The IBM SyNapse architecture includes a configuration of processors (i.e., simulated "neurons") that read a memory (i.e., a simulated "synapse") and perform simple operations. The communications between these processors, which are typically located in different cores, are performed by on-chip network routers.

Figure 2:
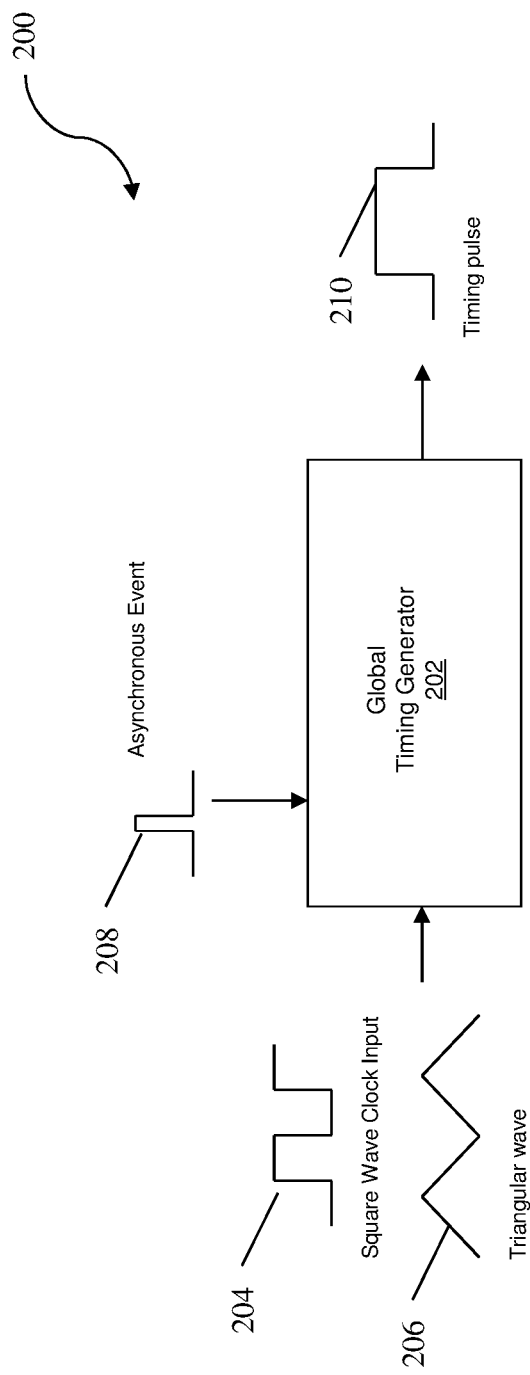
FIG. 2 is a block diagram of a system for generating a signal in response to an asynchronous event in accordance with one or more embodiments.

FIG. 2 illustrates a block diagram of the system 200 for generating a signal in response to an asynchronous event according to one or more embodiments. The global timing generator 202 has input ports for a square wave clock input 204 and a tringle wave input 206. In addition, the global timing generator 202 receives an asynchronous event 208. The asynchronous event 208 can be a neuron firing within a neural network. In a neural network a known timing interval is needed to properly generate an Axon and Dendrite signal when a neuron fires. The global timing generator 202 generates a timing pulse 210 in response to an asynchronous event 208. The timing pulse 210 has a period equal to the period of the triangle wave input 206.

Figure 3:
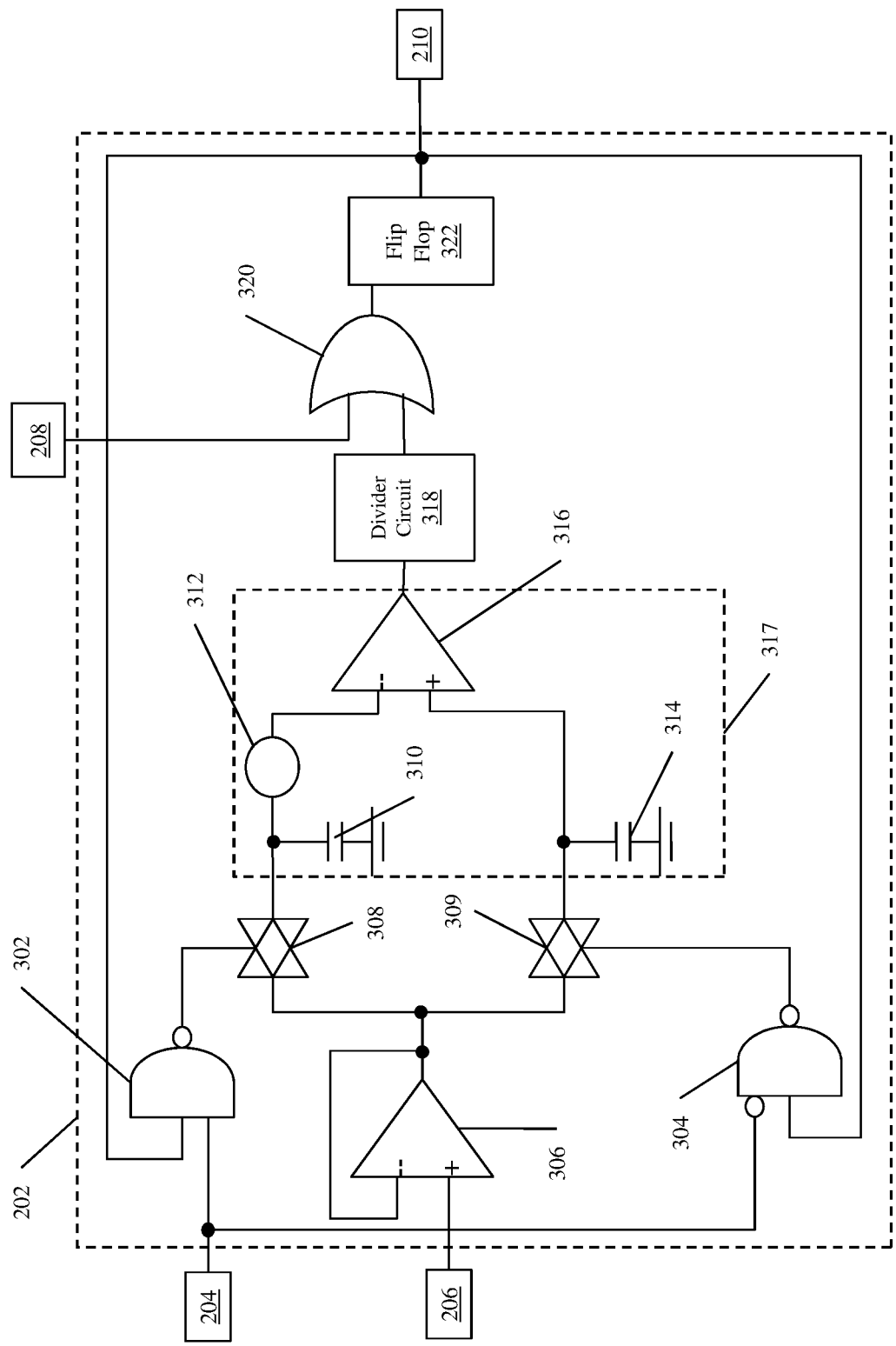
FIG. 3 is a circuit diagram for generating a signal in response to an asynchronous event in accordance with one or more embodiments.

FIG. 3 illustrates a circuit diagram of the global timing generator 202 according to one or more embodiments. The global timing generator 202 has an input port for a square wave clock input 204, a tringle wave clock input 206, an asynchronous event 208. The global timing generator 202 has an output port for a timing pulse 210. The global timing generator 202 includes two NAND gates 302, 304, a first operational amplifier (opamp) 306, a first transmission gate 308, a second transmission gate 309, a first capacitor 310 and a second capacitor 314, a voltage offset circuit 312, a second operational amplifier (opamp) 316, a divider circuit 318, a two input OR gate 320, and a flip flop 322.

The two NAND gates are a first NAND gate 302 and a second NAND gate 304. Each of the NAND gates has two inputs. One input of the first NAND gate 302 is the square wave clock input 204. One input of the second NAND gate 304 is an invert of the square wave clock input 204. The second input for both the first NAND gate 302 and the second 304 NAND gate is the output of the flip flop 322.

The first opamp 306 input is the triangle wave clock input 206. The first opamp 306 is a negative feedback amplifier. The first opamp 306 takes in the triangle wave clock input and the output is the triangle wave signal with an increase gain. The first opamp 306 output feeds into the first transmission gate 308 and the second 309 transmission gates. The outputs of the two NAND gates 302, 304 are coupled to the two transmission gates 308. When the output of first NAND gate 302 has a high signal, the first transmission gate 308 turns "on" allowing the output of the first operation amplifier 306 to charge to the first capacitor 310. When the output of the second NAND gate 304 has a high signal, the second transmission gate 309 turns "on" allowing the output of the first operation amplifier 306 to charge the second capacitor 314.

The first transmission gate 308 and the second transmission gate 309 act as an enable for the output of the first opamp 306. The signal leaving the output of the first opamp 306 is the triangle wave signal that passes through either the first transmission gate 308 or the second transmission gate 309 based upon receiving a high output from either the first NAND gate 302 or second NAND gate 304.

The first transmission gate 308 outputs to a wire attached to a first capacitor 310 and a voltage offset circuit 312 feeding into the negative input of the second opamp 316. The second transmission gate 309 outputs to a wire attached to a second capacitor 314 and feeding into the positive input of the second opamp 316. This configuration of capacitors, voltage offset and opamp can be referred to a comparator circuit 317 wherein the voltage offset circuit 312 measures the voltage difference between the first capacitor 310 and second capacitor 314. The output of the comparator circuit 317 is a square wave and is inputted into the divider circuit 318. In the illustrated embodiment, the divider circuit 314 is in a divide by 4 configuration.

The divider circuit 318 outputs into a two input OR gate 320. The other input for the OR gate 320 is the asynchronous event 208. The asynchronous event 208 is in the form of a pulse signal. The OR gate 320 outputs into a flip flop 322 which outputs to the timing pulse output 210. The flip flop 322 also outputs to the second input of both the first NAND gate 302 and second NAND gate 304.

In one or more embodiments, the asynchronous event 208 comprises a pulse which activates the circuit by producing a high voltage at the OR gate input which puts a high voltage at the input and then output of the flip flop 322. This output, which is coupled to an input of both the first NAND gate 302 and second NAND gate 304, enables the gates 302, 304 outputs which cause the transmission gates to enable on alternating high signals of the square wave clock input 204. By keeping a high signal at the input of the two NAND gates 302, 304 the outputs substantially mirrors an invert of the square wave signal enabling the two transmission gates 308, 309 on alternating high and low signals from the clock signal. As the triangle wave clock signal 206 is inputted through the first opamp 306, the first 308 and second 309 transmission gates alternate based upon the square wave clock signal input 204.

Figure 4:
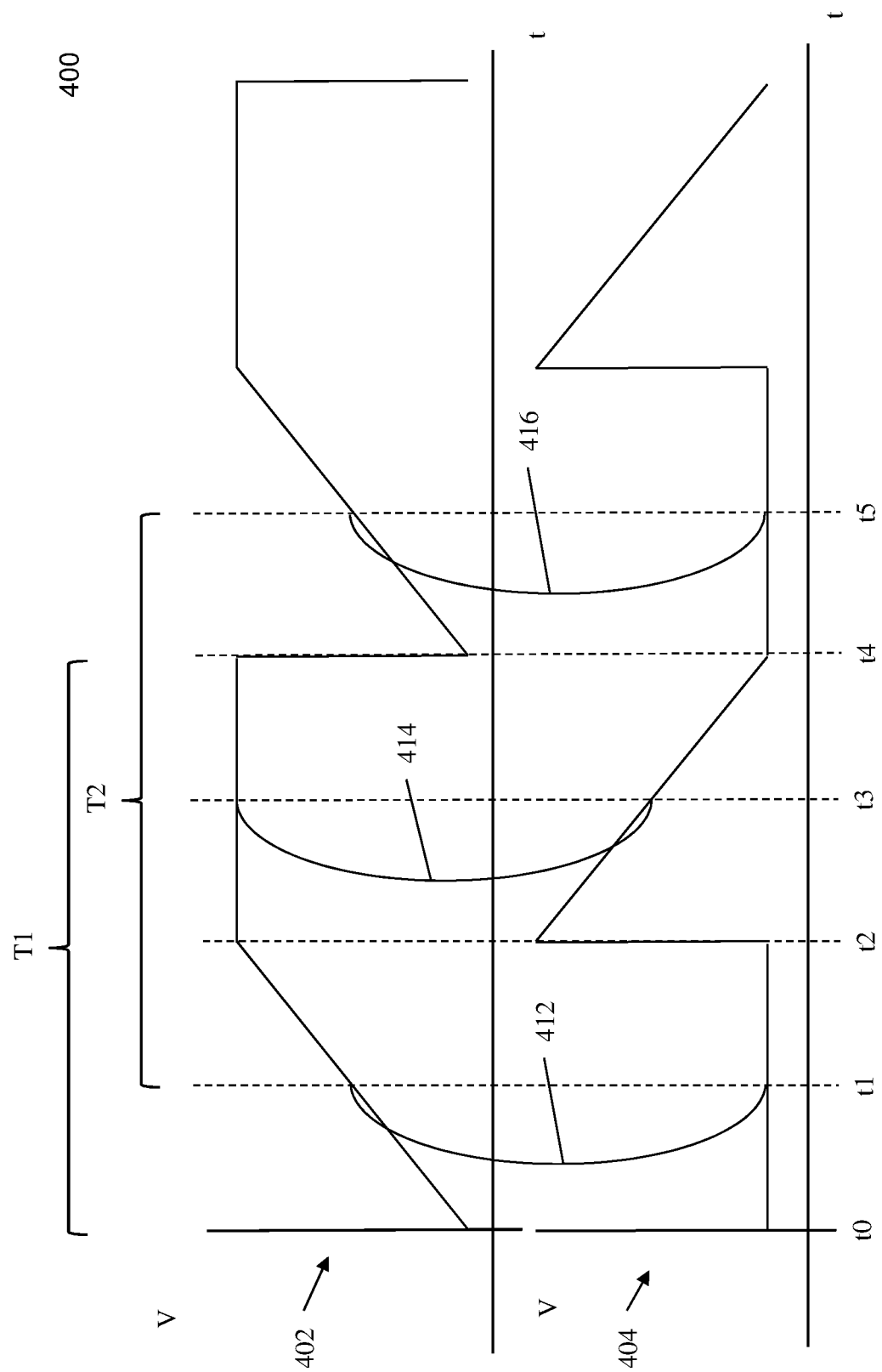
FIG. 4 is a graph of the voltage of two capacitors in a comparator in accordance with one or more embodiments.

FIG. 4 illustrates a graph of the voltage of the capacitors in the comparator according to one or more embodiments. The graph shows the first capacitor 310 voltage 402 over time t. The graph also shows the second capacitor 314 voltage 404 over time t. Time t0 represents the enabling (turning "on") of the first transmission gate 308 via the square wave clock input 204 into the first NAND gate 302 allowing the output of the first operation amplifier 306 to charge the first capacitor 310. As shown in the graph 400, the first capacitor 310 voltage 402 charges in a substantially similar shape as the triangle wave clock input. At time t2, the square wave input 204 alternates from low to high causing the first transmission gate 308 to turn "off" and the second transmission gate 309 to turn "on" allowing the output of the first operational amplifier to flow into the second capacitor 314. The second capacitor 314 voltage 404 is low from t0 to t2 because the second transmission gate is "off" and the second capacitor 314 is not being charged. At t2, the second capacitor 314 voltage 404 jumps to the voltage at the height of the triangle wave and then follow the shape of the triangle wave input 206 until it is in a low state at time t4. Time t4 represents a full period T1 of both the square wave clock signal and the triangle wave clock signal from time t0.

At time t1, an asynchronous event occurs. The voltage offset circuit 312 measures the first voltage difference 412 between the first capacitor 310 voltage 402 and the second capacitor 314 voltage 404. The voltage offset circuit 312 also measures the voltage to determine if the triangle wave is a rising edge or falling edge at the time the asynchronous event occurs. In the illustrated embodiment, at time t1, the triangle wave is on a rising edge. The voltage offset circuit 312 continues to measure the voltage difference between the two capacitors 310, 314. At time t3, the voltage offset circuit 312 measures the second voltage difference 414 which matches the first voltage difference 412 at time t1. Then, at time t5, the voltage offset circuit 312 measures the third voltage difference 416 which matches the first voltage difference 412 at time t1. The period between t1 and t5 is T2. T2 is the same period as T1.

Figure 5:
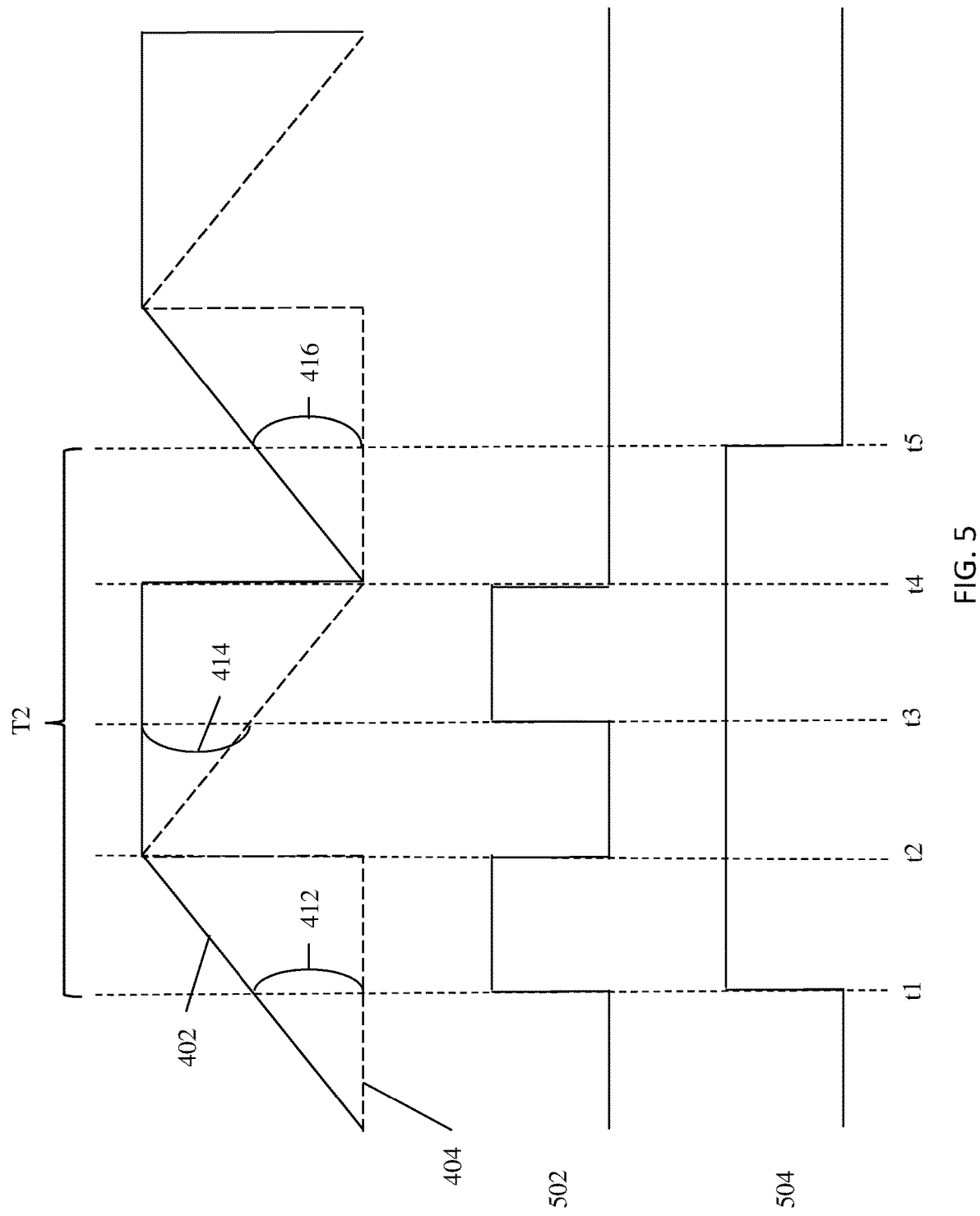
FIG. 5 is a graph of a voltage of two capacitors in a comparator and the output of a system for generating a signal in response to an asynchronous event according to one or more embodiments.

FIG. 5 illustrates a graph of the voltage of the capacitors in the comparator and the output of the system according to one or more embodiments. The graph shows the first capacitor voltage 402 and the second capacitor voltage 404 overlaid. The graph also shows the second operation amplifier 316 output 502 and the divider circuit 318 output 504.

As discussed above, an asynchronous event occurs at time t1. The second operation amplifier output 502 goes high and the voltage offset circuit 312 measures a first voltage difference 412 and a rising edge of the triangle wave. At time t2, the voltage offset circuit 312 measures the voltage difference to be zero as both the first capacitor voltage 402 and the second capacitor voltage 404 are equal. The voltage difference being zero caused the second operation amplifier output 502 to go low. At time t3, the voltage offset circuit 312 measures a second voltage difference 414 that is equal to the first voltage difference 412 causing the second operational amplifier output 502 to go high. At time t4, the voltage offset circuit 312 again measures a voltage difference to be zero as both the first capacitor voltage 402 and the second capacitor voltage 404 are equal. The voltage difference being zero caused the second operation amplifier output 502 to go low. At time t5, the voltage offset circuit measures a third voltage difference 416 that matches the first voltage difference 412 and a rising edge of the triangle wave and then turns the circuit 202 off. The divider circuit 318 is a divide by 4 divider circuit. The divider circuit output 504 is a pulse of length T2.

Figure 6:
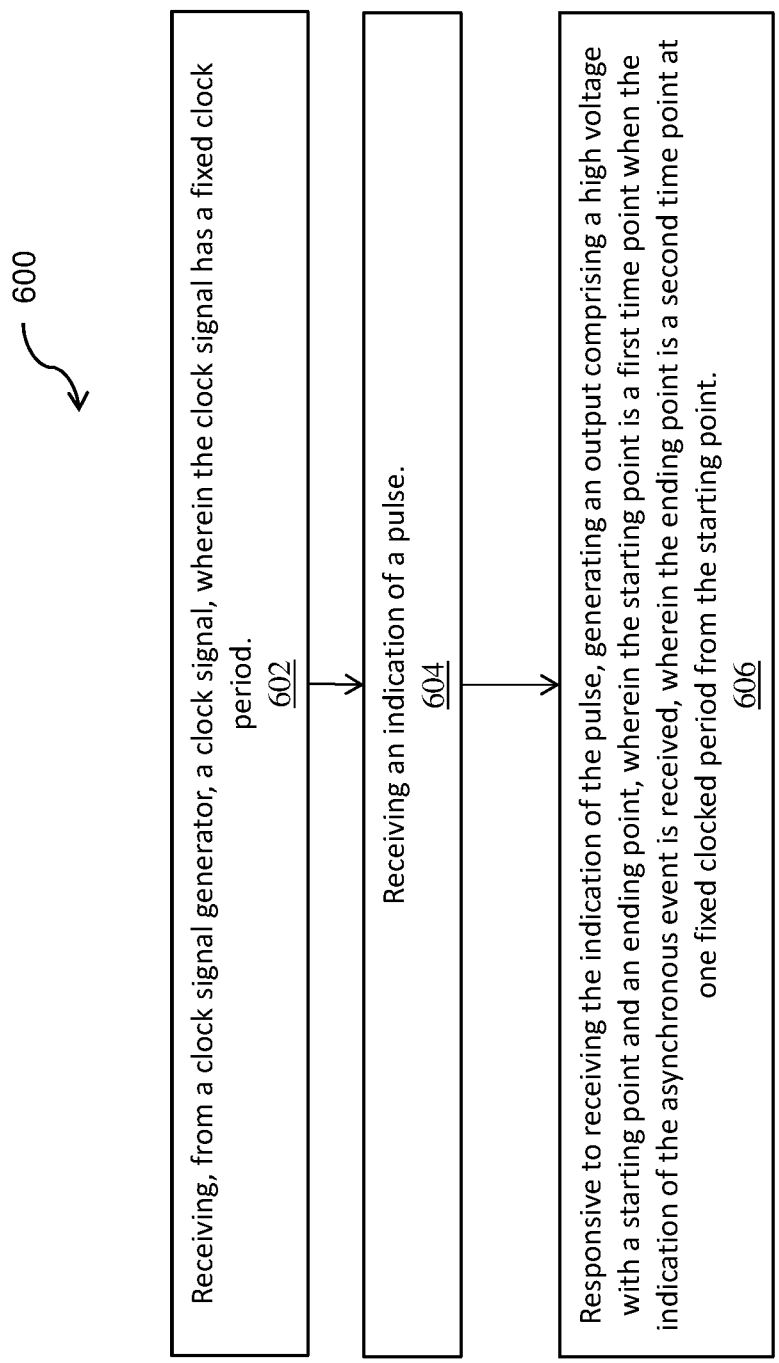
FIG. 6 is a block diagram of a method for generating a signal in response to an asynchronous event according to one or more embodiments.

FIG. 6 illustrates a block diagram of a method for generating a signal in response to an event according to one or more embodiments. The method 600 includes receiving, from a clock signal generator, a clock signal, wherein the clock signal has a fixed clock period, as shown at block 602. Next, at block 604, the method 600 includes receiving an indication of a pulse. The method 600 next includes responsive to receiving the indication of the pulse, generating an output comprising a high voltage with a starting point and an ending point, wherein the starting point is a first time point when the indication of the asynchronous event is received, wherein the ending point is a second time point at one fixed clocked period from the starting point as shown at block 606.

Additional processes may also be included. It should be understood that the processes depicted in FIG. 6 represent illustrations, and that other processes may be added or existing processes may be removed, modified, or rearranged without departing from the scope and spirit of the present disclosure.

Although the present disclosure is directed to an electronic system, for ease of reference and explanation various aspects of the disclosed electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

ANNs, also known as neuromorphic or synaptronic systems, are computational systems that can estimate or approximate other functions or systems, including, for example, biological neural systems, the human brain and brain-like functionality such as image recognition, speech recognition and the like. ANNs incorporate knowledge from a variety of disciplines, including neurophysiology, cognitive science/psychology, physics (statistical mechanics), control theory, computer science, artificial intelligence, statistics/mathematics, pattern recognition, computer vision, parallel processing and hardware (e.g., digital/analog/VLSI/optical).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A computer implemented method of generating a signal output in response to an event, the method comprising:
    receiving a reference signal, wherein the reference signal has a fixed period, and wherein the reference signal comprises a triangle wave signal;
    receiving, from a clock signal generator, a clock signal, wherein the clock signal comprises a square wave clock signal;
    receiving the event comprising an asynchronous pulse; and
    responsive to receiving the asynchronous pulse, generating the signal output comprising a first voltage with a starting time and an ending time, wherein the starting time is a first time when the asynchronous pulse is received;
    wherein generating the signal output comprises:
        measuring, by a voltage offset circuit, a first voltage difference between a first capacitor and a second capacitor at the first time;
        determining a first signal edge of the reference signal at the first time, wherein the signal edge comprises a rising edge or a falling edge;
        determining a second time based on a second voltage difference between the first capacitor and the second capacitor being equal to the first voltage difference and the signal edge of the reference signal, wherein the ending time is the second time at one fixed period from the starting time;
    wherein the asynchronous pulse comprises a firing of a neuron in a neural network.

2. The method of claim 1, wherein the fixed period is greater than 200 ms.

3. The method of claim 1, further comprising:
    comparing the voltage differences, via a comparator.

4. The method of claim 3, wherein the comparator comprises two capacitors, the voltage offset circuit and an operational amplifier.

5. A system for generating a signal output in response to an event, the system comprising:
    a processor communicatively coupled to a memory, the processor configured to perform a method comprising:
        receiving a reference signal, wherein the reference signal has a fixed period, and wherein the reference signal comprises a triangle wave signal;

receiving, from a clock signal generator, a clock signal, wherein the clock signal comprises a square wave clock signal;

receiving the event comprising an asynchronous pulse; and responsive to receiving the asynchronous pulse, generating the signal output comprising a first voltage with a starting time and an ending time, wherein the starting time is a first time when the asynchronous pulse is received;

wherein generating the signal output comprises:

measuring, by a voltage offset circuit, a first voltage difference between a first capacitor and a second capacitor at the first time;

determining a first signal edge of the reference signal at the first time, wherein the signal edge comprises a rising edge or a falling edge;

determining a second time based on a second voltage difference between the first capacitor and the second capacitor being equal to the first voltage difference and the signal edge of the reference signal, wherein the ending time is the second time at one fixed period from the starting time;

wherein the asynchronous pulse comprises a firing of a neuron in a neural network.

6. The system of claim 5, wherein the fixed period is greater than 200 ms.

7. The system of claim 5, further comprising:

comparing the voltage differences, via a comparator.

8. The system of claim 7, wherein the comparator comprises two capacitors, the voltage offset circuit and an operational amplifier.

9. A computer program product for generating a signal output in response to an event, the computer program product comprising a non-transitory computer readable storage medium having program instructions embodied therewith, the program instructions executable by a processor to cause the processor to perform a method comprising:

receiving a reference signal, wherein the reference signal has a fixed period, and wherein the reference signal comprises a triangle wave signal;

receiving, from a clock signal generator, a clock signal, wherein the clock signal comprises a square wave clock signal;

receiving the event comprising an asynchronous pulse; and responsive to receiving the asynchronous pulse, generating the signal output comprising a first voltage with a starting time and an ending time, wherein the starting time is a first time when the asynchronous pulse is received;

wherein generating the signal output comprises:

measuring, by a voltage offset circuit, a first voltage difference between a first capacitor and a second capacitor at the first time;

determining a first signal edge of the reference signal at the first time, wherein the signal edge comprises a rising edge or a falling edge;

determining a second time based on a second voltage difference between the first capacitor and the second capacitor being equal to the first voltage difference and the signal edge of the reference signal, wherein the ending time is the second time at one fixed period from the starting time;

wherein the asynchronous pulse comprises a firing of a neuron in a neural network.

10. The computer program product of claim 9, wherein the fixed period is greater than 200 ms.

11. The computer program product of claim 9, further comprising:

comparing the voltage differences, via a comparator.

\* \* \* \* \*